US012079386B2

(12) United States Patent
Fountain (10) Patent No.: US 12,079,386 B2
(45) Date of Patent: Sep. 3, 2024

(54) DEVICES HAVING PROTECTIVE SCREENS SELECTIVELY POSITIONABLE TO SWITCH DEVICES BETWEEN USER INTERFACE MODES AND METHODS OF OPERATING THE SAME

(71) Applicant: ZEBRA TECHNOLOGIES CORPORATION, Lincolnshire, IL (US)

(72) Inventor: Mark Thomas Fountain, London (GB)

(73) Assignee: Zebra Technologies Corporation, Linconlshire, IL (US)

( * ) Notice: Subject to any disclaimer, the term of this patent is extended or adjusted under 35 U.S.C. 154(b) by 0 days.

(21) Appl. No.: 17/026,923

(22) Filed: Sep. 21, 2020

(65) Prior Publication Data
US 2022/0083137 A1    Mar. 17, 2022

Related U.S. Application Data

(60) Provisional application No. 63/078,081, filed on Sep. 14, 2020.

(51) Int. Cl.
*G06F 3/01* (2006.01)
*G06F 1/16* (2006.01)
(Continued)

(52) U.S. Cl.
CPC ............. *G06F 3/014* (2013.01); *G06F 1/163* (2013.01); *G06F 1/1656* (2013.01);
(Continued)

(58) Field of Classification Search
CPC ........ G06F 3/014; G06F 1/1656; G06F 3/044; G06F 3/14; G06F 9/451; G06F 1/1677;
(Continued)

(56) References Cited

U.S. PATENT DOCUMENTS 5,646,649 A * 7/1997 Iwata .................... G06F 1/1626
345/169
7,791,587 B2 * 9/2010 Kosugi .................. G06F 1/169
345/169
(Continued)

FOREIGN PATENT DOCUMENTS

WO    2019148239 A1    8/2019
WO    2020132077 A1    6/2020

OTHER PUBLICATIONS

International Search Report and Written Opinion for International Application No. PCT/US2021/050152 mailed on Dec. 8, 2021.

*Primary Examiner* — Grant Sitta (57) ABSTRACT

An example assembly includes a core module including a processor, a display, a touch user interface (UI) element extending around at least a portion of an outer periphery of the display, and a non-transitory computer-readable medium storing instructions; a housing configured to removably receive the core module; and a cover selectively positionable in a first position to expose the touch UI element and the display, and in a second position to cover at least a portion of the touch UI element and at least a portion of the display, wherein the instructions, when executed by the processor, cause the core module to: when the cover is positioned in the first position, operate the display and the touch UI element according to a first functionality UI mode and, when the cover is positioned in the second position, the display and the touch UI element according to a second functionality UI mode.

17 Claims, 8 Drawing Sheets

(51) Int. Cl.
  *G06F 3/041* (2006.01)
  *G06F 3/044* (2006.01)
  *G06F 3/0488* (2022.01)
  *G06F 3/14* (2006.01)
  *G06F 9/451* (2018.01)
  *G06K 7/10* (2006.01)
  *G06K 7/14* (2006.01)
  *H01Q 1/27* (2006.01)

(52) U.S. Cl.
  CPC .......... *G06F 1/1677* (2013.01); *G06F 3/0416* (2013.01); *G06F 3/044* (2013.01); *G06F 3/0488* (2013.01); *G06F 3/14* (2013.01); *G06F 9/451* (2018.02); *G06K 7/10316* (2013.01); *G06K 7/10396* (2013.01); *G06K 7/1413* (2013.01); *H01Q 1/273* (2013.01)

(58) Field of Classification Search
  CPC ...... G06F 3/0416; G06F 3/0488; G06F 1/163; G06K 7/1413; G06K 7/10316; G06K 7/10356; G06K 19/0723; G06K 7/10891; G06K 7/10396; H01Q 1/273; G09G 2340/145; G09G 2370/16
  See application file for complete search history.

(56) References Cited

U.S. PATENT DOCUMENTS

| | | | |
|---|---|---|---|
| 8,928,437 B2* | 1/2015 | Lauder | H01F 7/04 361/679.01 |
| 8,972,283 B2* | 3/2015 | Hicks | G06Q 30/0281 705/17 |
| 9,010,641 B2* | 4/2015 | Qu | G06K 7/10732 235/462.15 |
| 9,326,404 B1* | 4/2016 | Wood | G06F 1/1626 |
| 9,478,113 B2* | 10/2016 | Xie | G06K 7/10158 |
| 9,514,342 B1* | 12/2016 | Hosseini | G06K 7/0008 |
| 9,729,184 B2* | 8/2017 | Lee | H04B 1/3888 |
| 10,019,613 B1* | 7/2018 | DeBates | G06K 7/10396 |
| 10,534,939 B1 | 1/2020 | Bellows | |
| 2002/0030094 A1* | 3/2002 | Curry | G06K 17/00 235/375 |
| 2009/0069045 A1* | 3/2009 | Cheng | H04M 1/0202 455/556.1 |
| 2009/0088230 A1* | 4/2009 | Park | H02J 7/32 455/575.6 |
| 2012/0127117 A1* | 5/2012 | Ku | B32B 27/304 345/174 |
| 2013/0017516 A1* | 1/2013 | Tyler | G04B 25/02 434/114 |
| 2014/0159839 A1* | 6/2014 | Kim | H01H 36/00 335/219 |
| 2014/0180019 A1* | 6/2014 | Martinez | A61B 5/681 600/301 |
| 2014/0268517 A1* | 9/2014 | Moon | H04B 1/3888 361/679.01 |
| 2014/0282059 A1* | 9/2014 | Oh | G06F 13/20 715/744 |
| 2015/0193645 A1* | 7/2015 | Colavito | G06K 7/1439 235/472.01 |
| 2015/0227274 A1* | 8/2015 | Lee | G06F 1/3265 715/776 |
| 2015/0261429 A1* | 9/2015 | Ghassabian | G06F 3/0482 715/773 |
| 2016/0103546 A1* | 4/2016 | Hemminki | G06F 1/1632 345/173 |
| 2016/0216694 A1* | 7/2016 | Kneebusch | G04G 17/08 |
| 2016/0267310 A1* | 9/2016 | AlNasser | G04B 37/1486 |
| 2016/0292477 A1* | 10/2016 | Bidwell | G06K 7/10831 |
| 2016/0335980 A1* | 11/2016 | Lee | H04M 1/72403 |
| 2016/0357324 A1* | 12/2016 | Smith | G06F 1/163 |
| 2017/0013108 A1* | 1/2017 | Penke | H04M 1/7246 |
| 2017/0031398 A1* | 2/2017 | Myers | G06F 1/182 |
| 2017/0108895 A1* | 4/2017 | Chamberlin | H02J 7/0044 |
| 2019/0104953 A1 | 4/2019 | Narasimhan | |
| 2019/0150308 A1* | 5/2019 | Takahashi | H05K 5/03 361/679.01 |
| 2019/0196535 A1* | 6/2019 | Paufler | G06F 3/0346 |
| 2019/0347459 A1* | 11/2019 | Miller | G06K 7/10891 |
| 2020/0096599 A1 | 3/2020 | Hewett et al. | |

* cited by examiner

DEVICES HAVING PROTECTIVE SCREENS SELECTIVELY POSITIONABLE TO SWITCH DEVICES BETWEEN USER INTERFACE MODES AND METHODS OF OPERATING THE SAME

FIELD OF THE DISCLOSURE

This application relates generally to devices having protective screens and, more particularly, to devices having protective screens selectively positionable to switch device between user interface modes and methods of operating the same.

BACKGROUND

Some devices, such as wearable or handheld barcode readers, are used in environments where they are susceptible to damage. Such devices often have protective covers that protect components (e.g., a display) from damage. While protective covers can protect a device from damage, they may reduce the functionality of the device. For example, small details presented on a display of the device may not be legible through a protective cover, a touch screen or capacitive touch element may not work in conjunction with a protective cover, etc.

Accordingly, there is a need for improved accessories having improved functionalities.

SUMMARY

Disclosed example devices have protective covers that overcome at least some of the deficiencies of traditional protective covers. Disclosed devices have protective covers that are selectively positionable by a user to switch a device between a first or full functionality user interface (UI) mode and a second or reduced functionality UI mode are disclosed. When a user selectively positions the protective cover in a first position where UI aspects of the device are exposed, the device automatically configures itself in the first or full functionality UI mode. In the first or full functionality UI mode, a display of the device may be configured in its highest resolution mode, touch aspects of the device may be enabled, etc. When a user selectively positions the protective cover in a second position where at least some UI aspects of the device are covered or protected, the device automatically configures itself in the second or reduced functionality UI mode. In the second or reduced functionality UI mode, a display may be configured in a lower resolution and/or reduced power consumption mode, at least some touch aspects may be disabled, portions of the display may be disabled, etc.

An interactive larger display (e.g., a 1.8 inch display) for exception handling and alphanumeric input is desired. However, protection and display size oppose one another. Therefore, in disclosed embodiments, the device includes a 1.8" AMAOLED display that can be partially covered in normal use by a protective cover. The covered section of the display can effectively be switched off by not displaying any graphics which advantageously reduces power consumption. This only exposes a small portion of the display for, for example, two lines of text, large touch graphics that can be heavily protected. When increased UI fidelity is required for exception handling, the protective cover can be rotated up exposing the rest of the display. The display can now be operated as a full touchscreen interface. A method of detecting if the cover is in an up or open position, or a down or closed position allows for automatic switching between the two UI modes. The cover also contains a translucent window that allows for a large graphic to be illuminated on the display when additional attention is needed or alerting the user to open the cover to handle an exception. Cover down or closed state also disables the unexposed areas of touchscreen and touch bezel.

In an embodiment, an assembly comprises: a core module including a processor, a display, a touch user interface (UI) element extending around at least a portion of an outer periphery of the display, a non-transitory computer-readable medium storing instructions, a housing configured to removably receive the core module, and a cover selectively positionable in first and second positions. The first position exposes the touch UI element and the display. The second position covers at least a portion of the touch UI element and at least a portion of the display. The instructions, when executed by the processor, cause the core module to: when the cover is positioned in the first position, operate the display and the touch UI element according to a first functionality UI mode and, when the cover is positioned in the second position, operate the display and the touch UI element according to a second functionality UI mode.

In another embodiment, a method of operating a wearable device including a display, a user interface (UI) element extending around at least a portion of an outer periphery of the display, and a cover selectively positionable in a first position to expose the UI element and the display, and in a second position that covers at least a portion of the UI element and at least a portion of the display, the method comprising: detecting a position of the cover; when the position of the cover is the first position, operating the display and the UI element according to a first functionality UI mode; and when the cover is positioned in the second position, operating the display and the UI element according to a second functionality UI mode.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Reference will now be made in detail to non-limiting examples, some of which are illustrated in the accompanying drawings.

Figure 1:
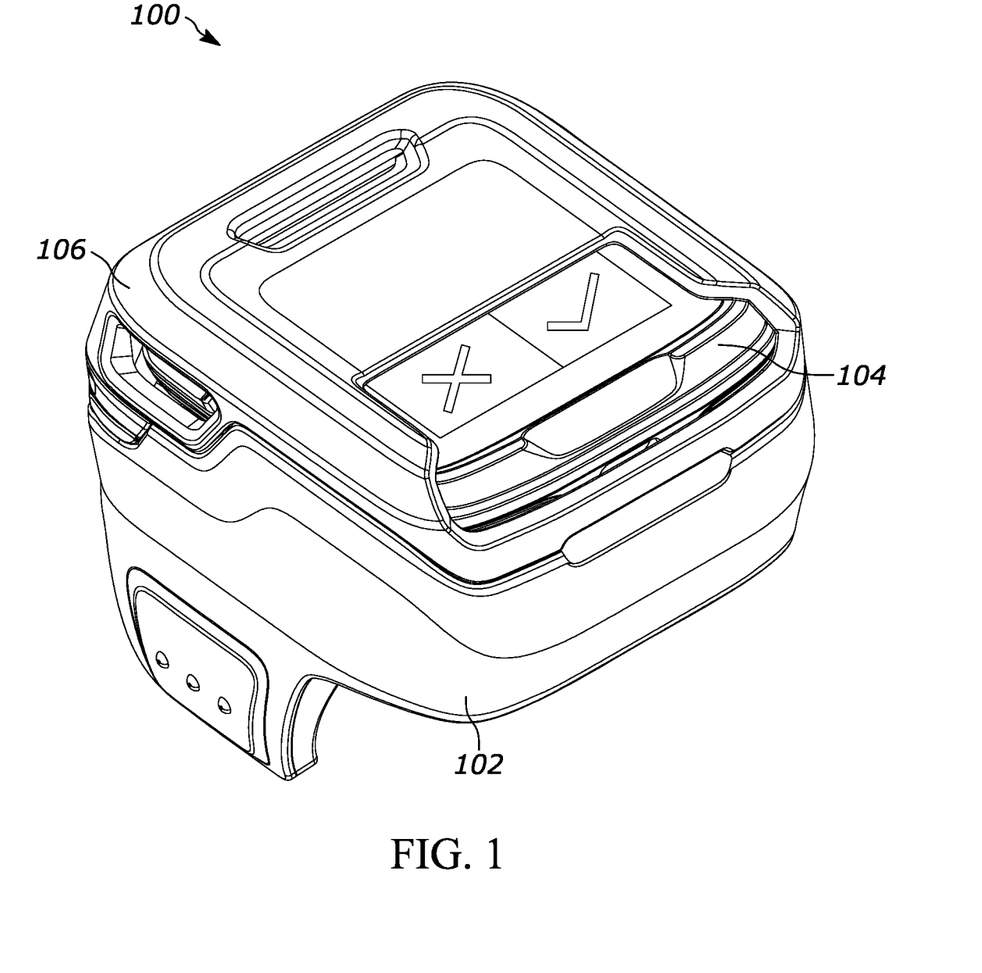
FIG. 1 illustrates an example device having a protective cover, in accordance with aspects of this disclosure.
Figure 2:
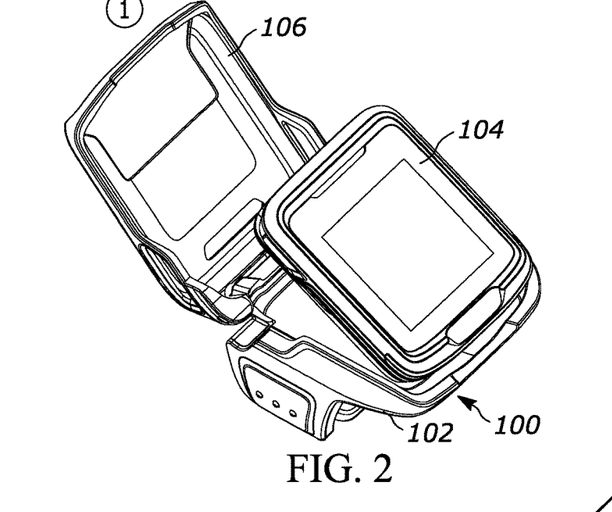
FIGS. 2-5 illustrate a sequence of operations to secure a core module in a housing using a protective cover, in accordance with aspects of this disclosure.
Figure 3:
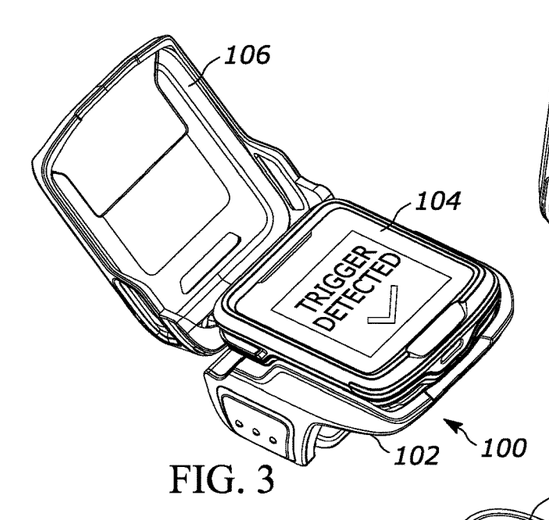

FIG. 1 illustrates an example device 100 in accordance with aspects of this disclosure. The device 100 may be a barcode reader configured to capture an image of printed identification data such as a barcode, indicia or the like, and/or to electromagnetically read electrical identification data such as a radio frequency identification (RFID) tag, near field communication (NFC) tag, or the like. The device 100 includes an example housing 102 in which a core module 104 is selectively received, and a protective cover 106 that is coupled (e.g., rotatably or slidably) to the housing 102 to selectively secure the core module 104 within the housing 102.

Figure 4:
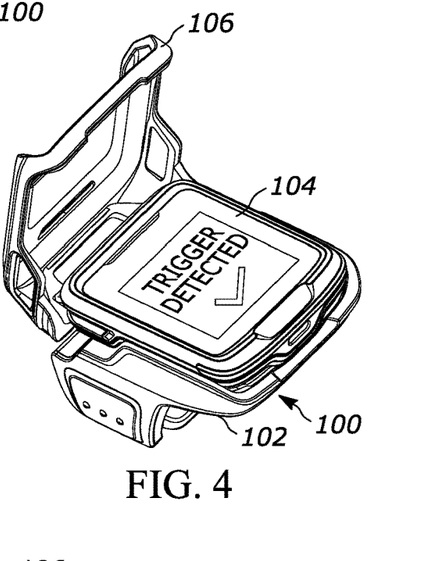
Figure 5:
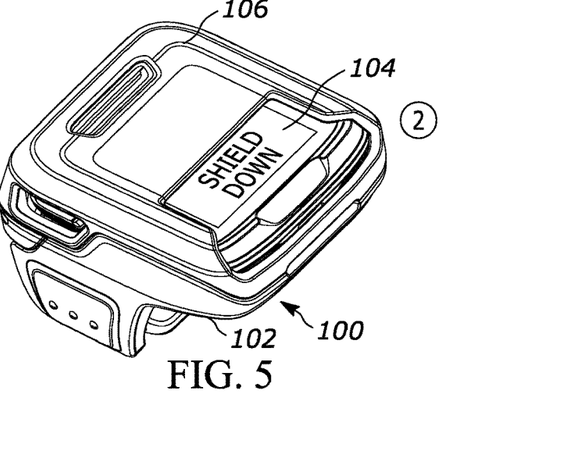

FIGS. 2-5 illustrate an example sequence of installing the core module 104 in the housing 102. Starting with FIG. 2, the protective cover 106 is in a first or open position ①, and one end of the core module 104 is inserted into the housing 102. In the first or open position ①, the protective screen 106 does not interfere with use of the core module 104. Continuing with FIG. 3, the core module 104 is selectively inserted the rest of the way into the housing 102 and, in some examples, is activated or turns on. In FIG. 4, downward rotation of the protective cover 106 begins and continues until the protective cover 106 is positioned in a second or closed position ② in FIG. 5. In the second or closed position in FIG. 5, the protective cover 106 secures the core module 104 in the housing 102 and covers portions of the core module 104, thereby providing protection for the core module 104. The core module 104 can be selectively removed from the housing 102 by reversing the sequence of FIGS. 2-5. While a rotatable protective cover 106 is shown in FIGS. 1-5, the protective cover 106 may in some alternatives be selectively slidable between a first or open position (not shown) and the second or closed position ② of FIG. 5. In some examples, the protective cover 106 is removable or replaceable.

Figure 6:
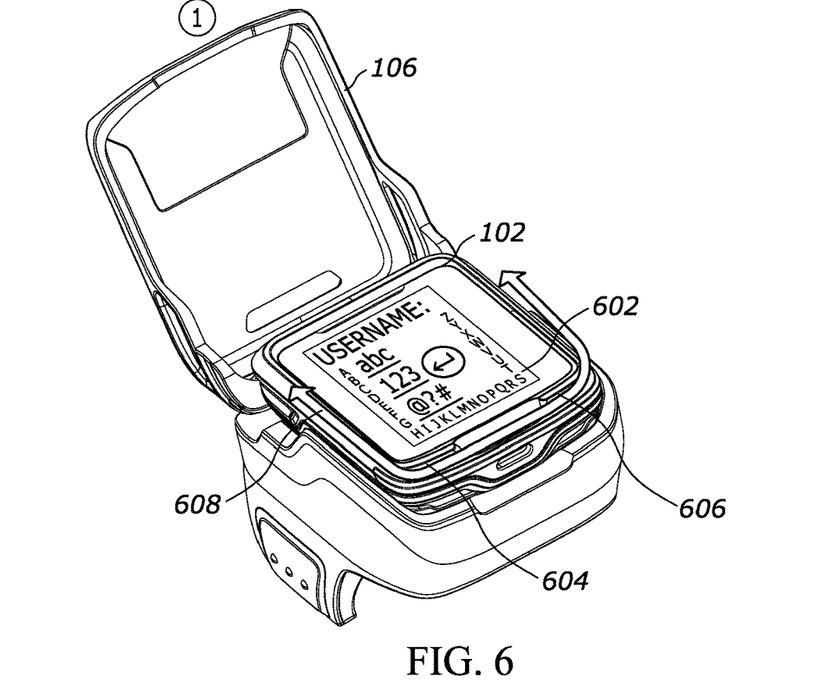
FIGS. 6 and 7 illustrate example full functionality UI mode operations of the example device of FIG. 1.
Figure 7:
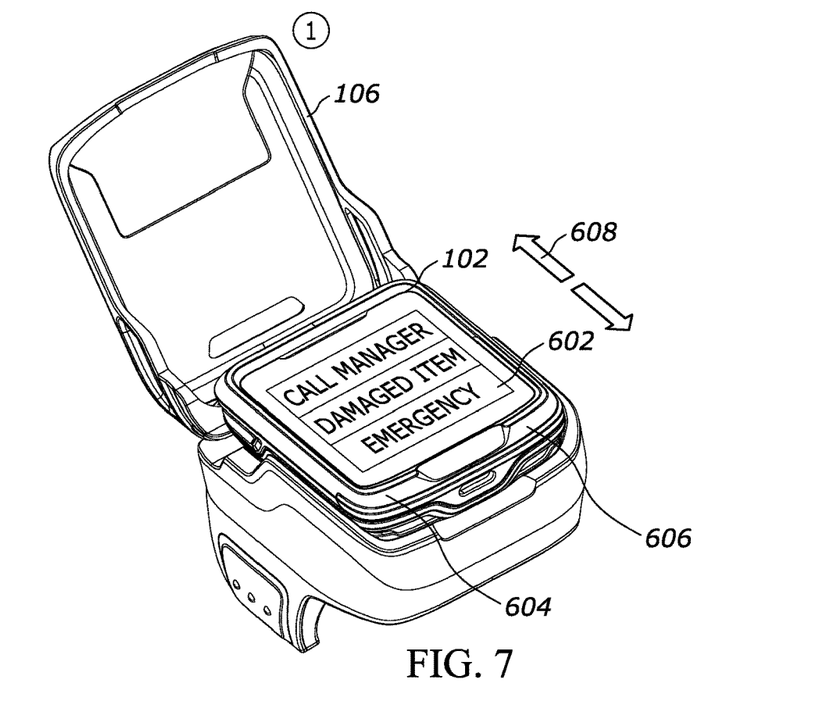

In addition to selectively moving the protective cover 106 to secure or unsecure the core module 104, the protective cover 106 can be selectively positioned to trigger the core module 104 to switch between UI modes. For example, while the protective cover 106 is in the first or open position ①, the protective cover 106 does not cover or interfere with operation of the core module 104. Accordingly, the core module 104 is triggered to operate according to a first or full functionality UI mode. In some examples, "full functionality UI mode" refers to a mode of operating a device such that all of the possible capabilities and features of the device are available for use by a UI executing on the device. For example, in the first or full functionality UI mode, a display 602 (see FIGS. 6 and 7) of the core module 104 is configured to operate in its highest resolution with touch functionality enabled, and a capacitive touch UI element 604 on a bezel 606 surrounding the display 602 is enabled for swiping motions 608 of a finger. An example touch UI element 604 is a touch sensor, such as a capacitive touch sensor. As shown in FIGS. 6 and 7, the touch display 602 and/or capacitive touch UI element 604 can be configured to enable, for example, text entry, menu operation, scrolling, selecting items, etc. with a user's finger.

An interactive larger display (e.g., a 1.8 inch display) for exception handling and alphanumeric input is provided. These factors (i.e., protection and display size) oppose one another. Therefore, in the illustrated embodiments, the device 100 includes a 1.8" AMAOLED display that can be partially covered in normal use by a protective cover. The covered section of the display can effectively be switched off by not displaying graphics, thus reducing power consumption. This only exposes a small screen for two lines of text, while the remainder of the display is heavily protected. When increased UI fidelity is required for exception handling, the protective cover can be rotated up exposing the rest of the display. Accordingly, in this configuration, a user may interact with the display as a touchscreen interface. A method of detecting if the protective cover is in an up or down position allows for automatic switching between the two user interfaces. In some examples, the protective cover may also contain a translucent window that allows for a large graphic to be illuminated on the display when additional attention is needed or alerting the user to open the protective cover to handle an exception. In some examples, when the protective cover 106 is in a lowered position, the device may also disable the unexposed areas of touchscreen and the touch bezel.

Figure 8:
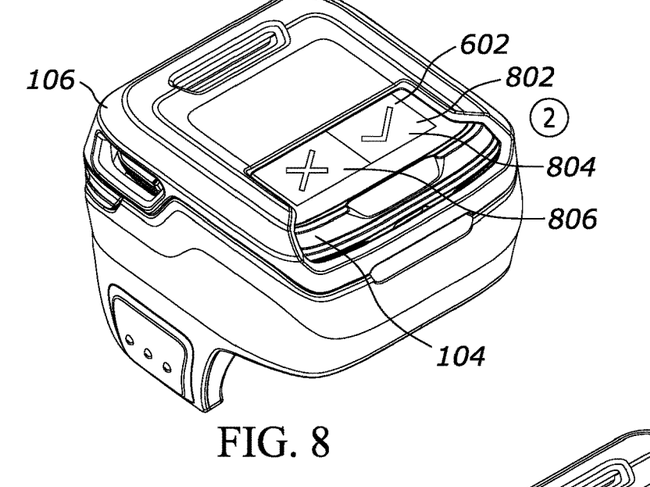
FIGS. 8-10 illustrate example reduced functionality UI mode operations of the example device of FIG. 1.
Figure 9:
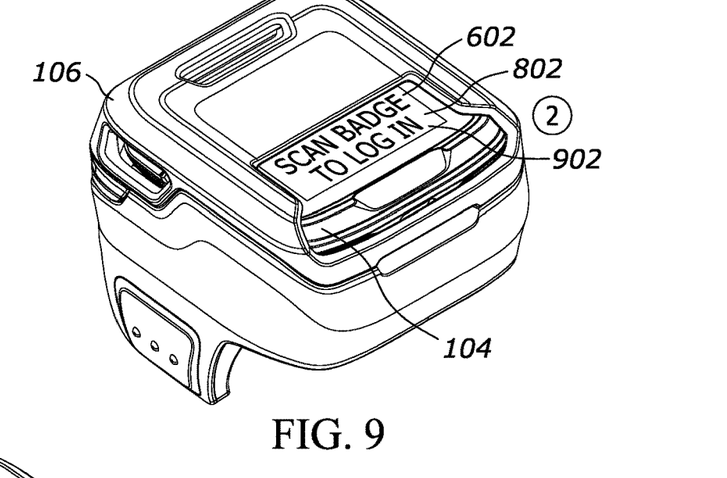
Figure 10:
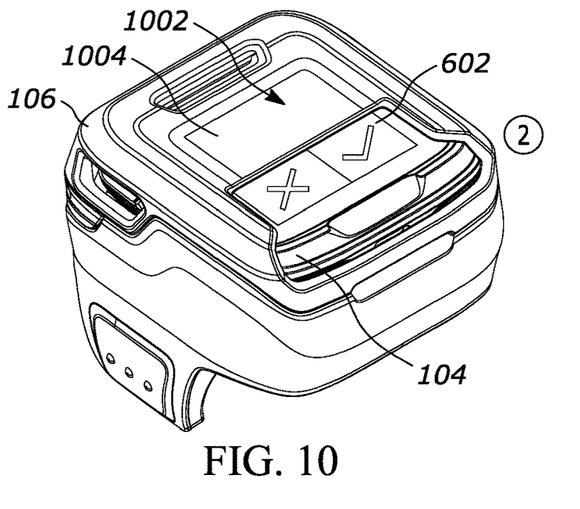

While the protective cover 106 is in the second or closed position ②, the protective cover 106 covers, limits access to, or otherwise interferes with at least some aspects of the core module 104. Accordingly, the core module 104 is triggered to operate according to a second or reduced functionality UI mode. In some examples, "reduced functionality UI mode" refers to a mode of operating a device such that fewer than all of the possible capabilities and features of the device are available for use by a UI executing on the device. For example, 95%, 85%, 75%, . . . 10% or 5% of all of the possible capabilities and features of the device are available for use by a UI executing on the device. For example, in the second or reduced functionality UI mode, only an uncovered or exposed portion 802 of the display 602 is operated (e.g., turned on) and, in some instances, with reduced resolution. For example, in FIG. 8, the uncovered portion 802 operates as just two large, lower-resolution touch areas 804, 806. In an example in FIG. 9, the uncovered or exposed portion 802 display two simple lines of text 902 without any touch input. In an example in FIG. 10, a portion 1002 of the display 602 is covered beneath a translucent portion 1004 of the protective cover 106, and the portion 1002 is operated to display visual elements that are perceivable through the translucent portion 1004. In the second or reduced functionality UI mode the portion(s) of the capacitive touch UI element 604 that are covered by the protective cover 106 may be disabled.

In use, a user may normally use the device 100 with the protective cover 106 in the second or closed position ② because they primarily only need the functionality of the second or reduced functionality UI mode. If or as need arises, the user may selectively position the protective cover 106 in the first or open position ①, thereby, activating the first or full functionality UI mode. The user may then access more advanced functionality of the core module 104. When full functionality UI mode is no longer needed, the user can selectively position the protective cover 106 in the second or closed protective position ②, thereby, triggering the core module 104 to return to the normally used, second or reduced functionality UI mode and restore protection for the core module 104.

Figure 11:
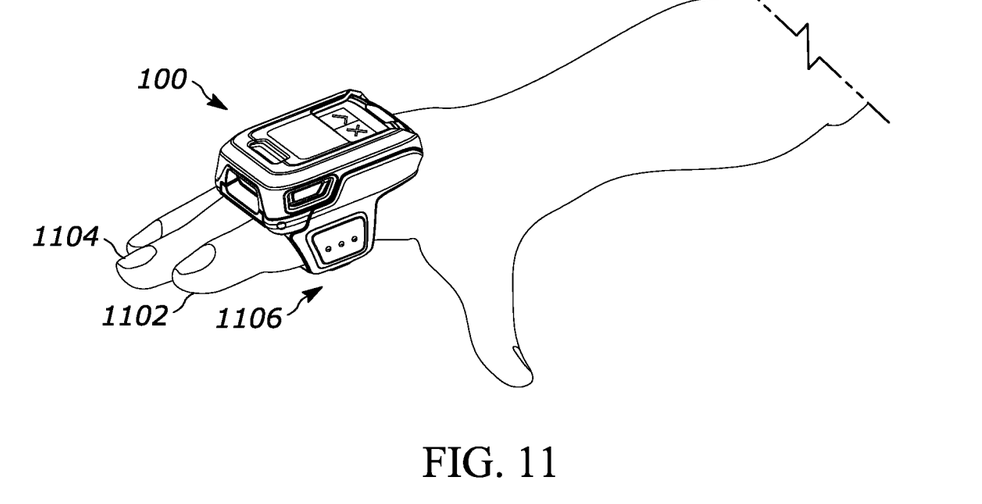
FIG. 11 illustrates an example embodiment of the device of FIG. 1 as a wearable device.
Figure 12:
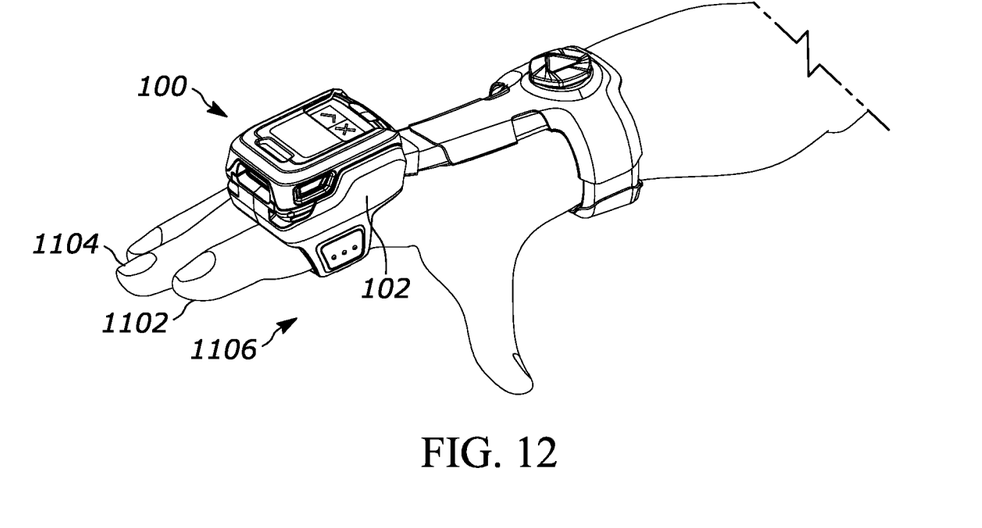
FIG. 12 illustrates another example embodiment of the device of FIG. 1 as a wearable device.
Figure 13:
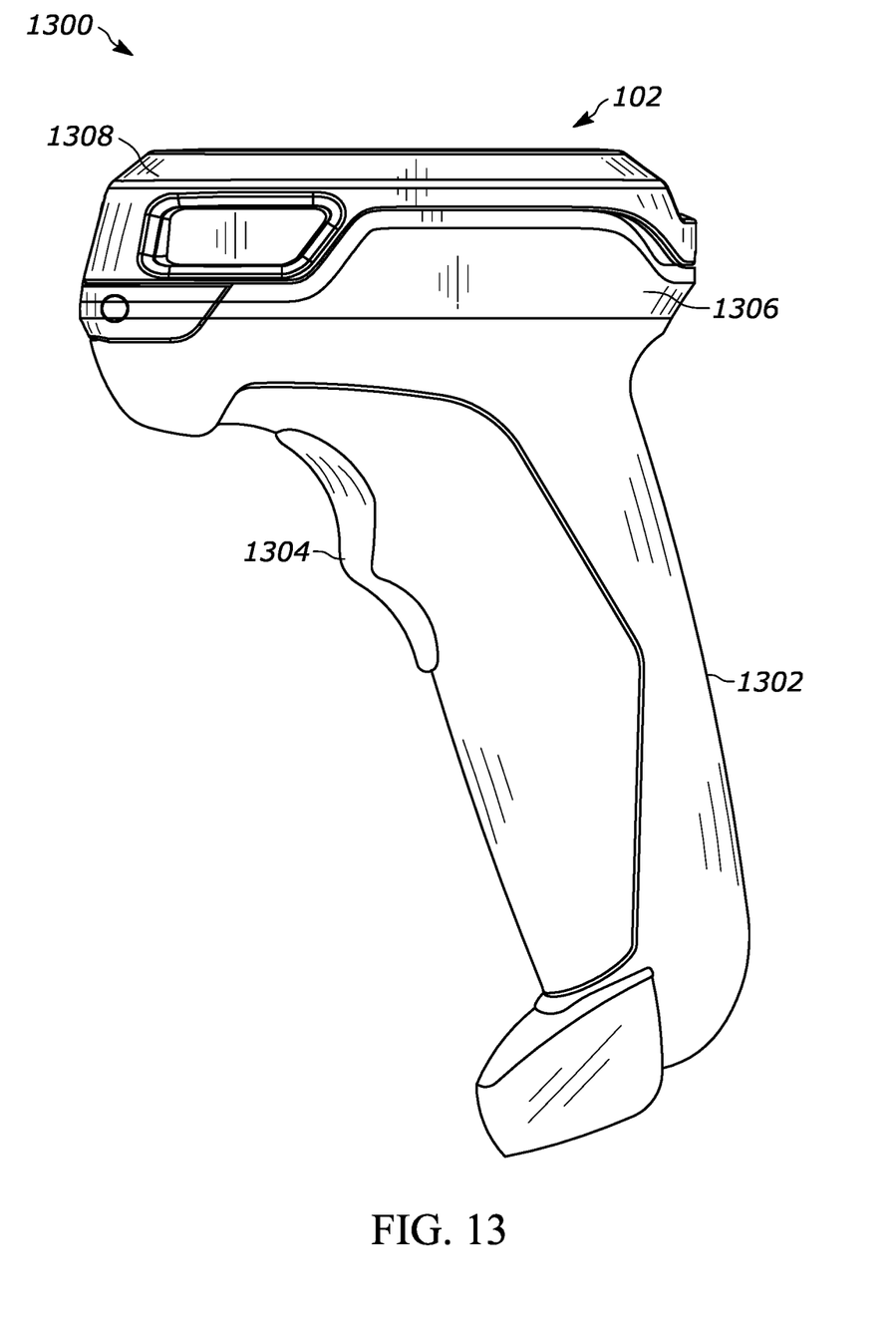
FIG. 13 illustrates an example embodiment of the device of FIG. 1 as a handheld device.

As shown in FIG. 11, the housing 102 is formed to configure the device 100 as a wearable device that is worn on two fingers (e.g., pointer finger 1102 and middle finger 1104) of a wearer's hand 1106. As shown in FIG. 12, the housing 102 and/or, more generally, the device 100 may be coupled to a flexible member that extends down the top of the hand 1106 and around the wrist. As shown in FIG. 13, the housing 102 instead may be embodied as a handheld barcode reader gun 1300 having a generally elongated handle or lower handgrip portion 1302, a trigger 1304, an upper body or top portion 1306 that receives the core module 104, and a selectively positionable protective cover 1308. While example device configurations are shown in FIGS. 1, and 11-13, persons of ordinary skill in the art will readily appreciate that devices having protective covers in accordance with aspects of this disclosure may be arranged in other configurations.

Figure 14:
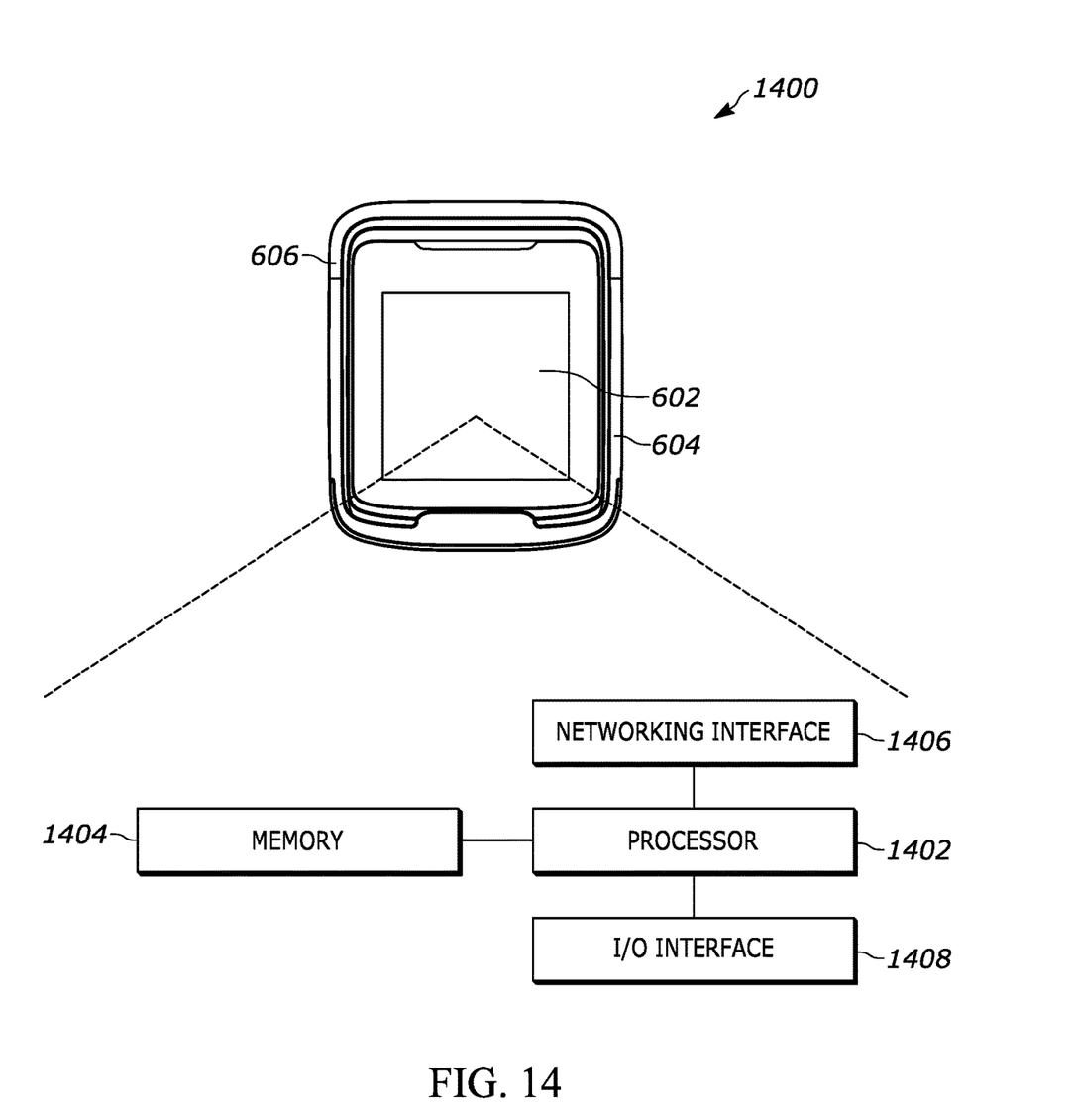
FIG. 14 is a block diagram of an example logic circuit for implementing example methods and/or operations described herein.

FIG. 14 is a block diagram representative of a logic circuit in the form of an example processing platform 1400 that may be used to implement the core module 104. The processing platform 1400 is capable of executing instructions to, for example, implement operations of the example methods described herein. Other example logic circuits capable of, for example, implementing operations of the example methods described herein include field programmable gate arrays (FPGAs) and application specific integrated circuits (ASICs).

The example processing platform 1400 of FIG. 14 includes a processor 1402 such as, for example, one or more microprocessors, controllers, and/or any suitable type of processor. The example processing platform 1400 of FIG. 14 includes any number or types of non-transitory memory 1404 (e.g., volatile memory, non-volatile memory, etc.) and/or storage devices accessible by the processor 1402 (e.g., via a memory controller) in which information may be stored for any duration (e.g., permanently, for an extended time period, for a brief instance, for temporarily buffering, for caching of the information, etc.). The example processor 1402 interacts with the memory 1404 to obtain, for example, computer- or machine-readable instructions stored in the memory 1404 corresponding to, for example, the operations disclosed herein. Additionally or alternatively, computer- or machine-readable instructions corresponding to the example operations described herein may be stored on one or more removable media (e.g., an optical storage drive, a compact disc, a digital versatile disk, a removable flash memory, etc.) that may be coupled to the processing platform 1400 to provide access to the computer- or machine-readable instructions stored thereon.

The example processing platform 1400 of FIG. 14 also includes a network interface 1406 to enable communication with other machines via, for example, one or more networks. The example network interface 1406 includes any suitable type of communication interface(s) (e.g., wired and/or wireless interfaces) configured to operate in accordance with any suitable protocol(s) like, for example, a TCP/IP interface, a Wi-Fi™ transceiver (according to the IEEE 802.11 family of standards), an Ethernet transceiver, a cellular network radio, a satellite network radio, or any other suitable communication protocols or standards.

The example processing platform 1400 of FIG. 14 also includes input/output (I/O) interfaces, circuits, components 1408 to enable receipt of user input and communication of output data to the user. The I/O interfaces, circuits, components 1408 may, additionally and/or alternatively, enable the processor 1402 to communicate with peripheral I/O devices. Example I/O interfaces, circuits, components 1408 include the display 602, a universal serial bus (USB) interface, a Bluetooth® interface, an NFC interface, an RFID radio, an RFID antenna, a barcode reader, an imaging assembly, the capacitive touch UI element 604, and/or an infrared transceiver. The peripheral I/O devices may be any desired type of I/O device such as a keyboard, a navigation device (e.g., a mouse, a trackball, a capacitive touch pad, a joystick, etc.), a speaker, a microphone, a printer, a button, etc.

The I/O interfaces, circuits, components 1408 may be used to monitor the position of the protective cover 106. In some examples, the protective cover 106 includes one or more conductive pads that the core module 104 can sense when they come into contact or near contact with the capacitive touch UI element 604 when the protective cover 106 is in the second or closed position ②. In some examples, the core module 104 includes a proximity sensor that enables the core module 104 to sense the protective cover 106 in front of the hinged end of the core module 104 when the protective cover 106 is in the first or open position ①. In some examples, the protective cover 106 includes a magnet that the core module 104 can sense via a Hall sensor of the core module 104 when the protective cover 106 is in the second or closed position ②.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored computer- or machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes computer- or machine-readable instructions to perform operations (e.g., one or more of the operations described herein and/or represented by the flowcharts of this disclosure, if such are present). Some example logic circuits include a combination of specifically configured hardware and hardware that executes computer- or machine-readable instructions. The above description refers to various operations described herein and/or flowcharts that may be appended hereto to illustrate the flow of those operations. Any such descriptions and/or flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by computer- or machine-readable instructions (e.g., software and/or firmware) stored on a medium (e.g., a tangible computer- or machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and computer- or machine-readable instructions stored on a medium (e.g., a tangible computer- or machine-readable medium) for execution by logic circuit(s).

Figure 15:
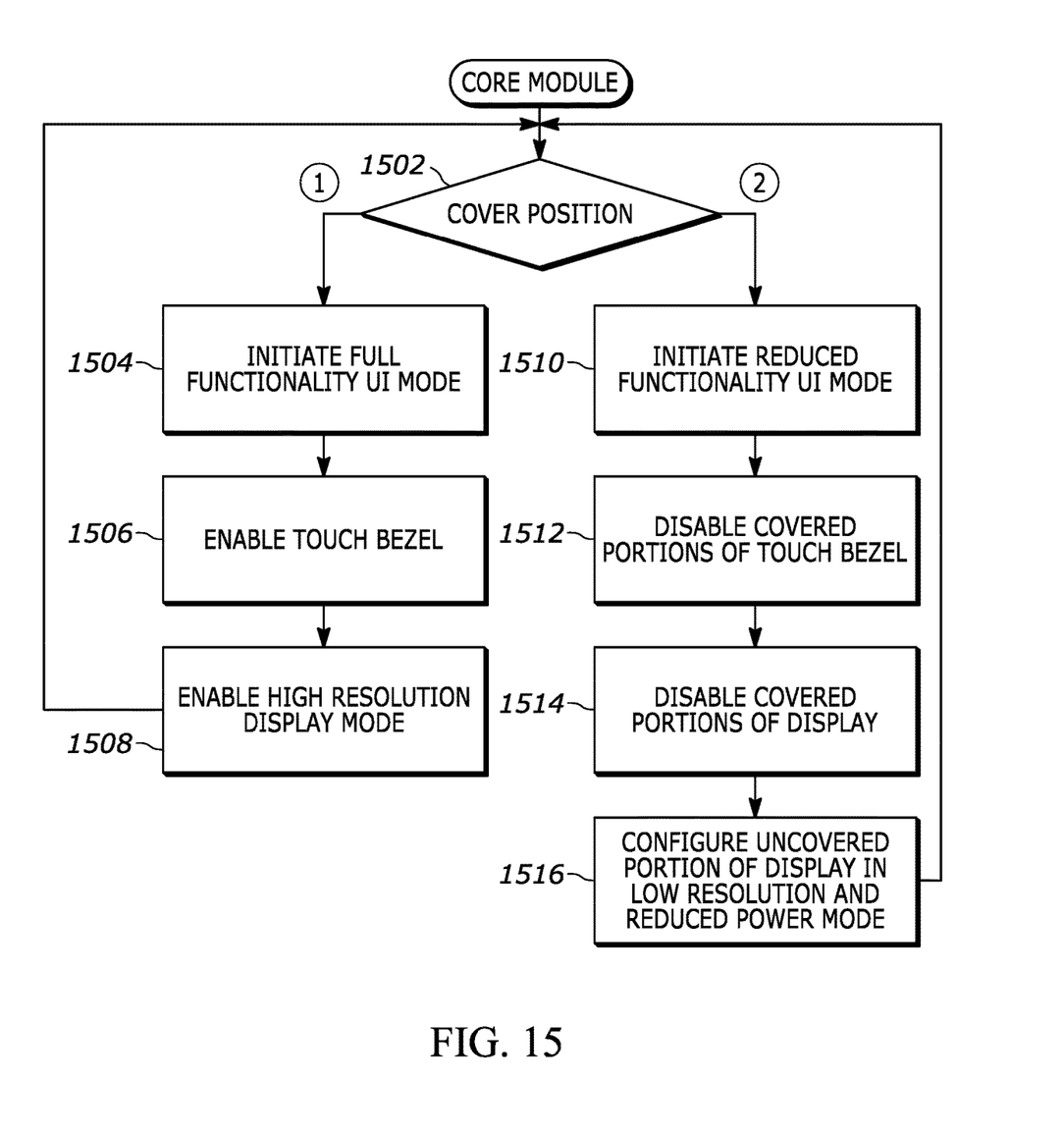
FIG. 15 is a flowchart representative of an example method, hardware logic or machine-readable instructions for implementing the example core module of FIG. 1, in accordance with aspects of this disclosure.

A flowchart 1500 representative of example processes, methods, software, computer- or machine-readable instructions, etc. for implementing the core module 104 is shown in FIG. 15. The processes, methods, software and instructions may be an executable program or portion of an executable program for execution by a processor such as the processor 1402 of FIG. 14. The program may be embodied in software or instructions stored on a non-transitory computer- or machine-readable storage medium such as a compact disc (CD), a hard drive, a digital versatile disk (DVD), a Blu-ray disk, a cache, flash memory, read-only memory (ROM), random access memory (RAM), a ROM (Read Only Memory), a PROM (Programmable Read Only Memory), an EPROM (Erasable Programmable Read Only Memory), an EEPROM (Electrically Erasable Programmable Read Only Memory), or any other storage device or storage disk associated with the processor 1402 in which information is stored for any duration (e.g., for extended time periods, permanently, for brief instances, for temporarily buffering, and/or for caching of the information). Further, although the example program is described with reference to the flowchart illustrated in FIG. 15, many other methods of implementing the example core module 104 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an ASIC, a PLD, an FPGA, an FPLD, a logic circuit, etc.) structured to perform the corresponding operation without executing software or instructions.

The example program of FIG. 15 begins with the processor 1402 or, more generally, the core module 104 determining whether the protective cover 106 is in the first or open position ① (block 1502). If the protective cover 106 is in the first or open position ① (block 1502), the core module 104 initiates the first or full functionality UI mode (block 1504) by enabling all of the capacitive touch UI element 604 on the bezel 606 surrounding the display 602 (block 1506) and configuring the display 602 in its highest supported resolution mode and enabling touch input (block 1508). Control then returns to block 1502 to monitor the position of the protective cover 106.

If the protective cover 106 is in the second or closed position ② (block 1502), the core module 104 initiates the second or reduced functionality UI mode (block 1510) by disabling covered portions of the capacitive touch UI element 604 on the bezel 606 surrounding the display 602 (block 1512), disabling covered portions 1002 of the display 602 (block 1514), and configuring exposed or uncovered portions 802 of the display 602 in a lower resolution and reduced power consumption mode (block 1516). Control then returns to block 1502 to monitor the position of the protective cover 106.

Example devices having protective screens selectively positionable to switch device between UI modes and methods of operating the same are disclosed herein. Further examples and combinations thereof include at least the following.

Example 1 is an assembly comprising: a core module including a processor, a display, a touch UI element extending around at least a portion of an outer periphery of the display, and a non-transitory computer-readable medium storing instructions; a housing configured to removably receive the core module; and a cover selectively positionable in a first position to expose the touch UI element and the display, and in a second position to cover at least a portion of the touch UI element and at least a portion of the display, wherein the instructions, when executed by the processor, cause the core module to: when the cover is positioned in the first position, and operate the display and the touch UI element according to a first functionality UI mode and, when the cover is positioned in the second position, operate the display and the touch UI element according to a second functionality UI mode.

Example 2 is the assembly of example 1, wherein the first functionality UI mode is a full functionality UI mode, and the second functionality UI mode is a reduced functionality UI mode.

Example 3 is the assembly of example 1 or example 2, wherein the instructions, when executed by the processor, cause the core module to detect the position of the cover.

Example 4 is the assembly of any of examples 1 to 3, wherein the cover includes a conductive pad, and the instructions, when executed by the processor, cause the core module to detect the cover in the second position by sensing contact or near contact between the conductive pad and the touch UI element or the display.

Example 5 is the assembly of any of examples 1 to 4, wherein the core module includes a proximity sensor, and the instructions, when executed by the processor, cause the core module to detect the cover in the first position when the proximity sensor senses the cover in the first position.

Example 6 is the assembly of any of examples 1 to 5, wherein the cover includes a magnet, the core module includes a Hall sensor, and the instructions, when executed by the processor, cause the core module to detect the cover in the second position when the Hall sensor senses the magnet.

Example 7 is the assembly of any of examples 1 to 6, wherein the instructions, when executed by the processor, cause the core module to operate the display according to the first functionality UI mode by configuring a highest supported resolution on the display, and activating touch input.

Example 8 is the assembly of any of examples 1 to 7, wherein the instructions, when executed by the processor, cause the core module to operate the display according to the second functionality UI mode by configuring the display in a reduced power consumption mode and a reduced resolution on an exposed portion of the display.

Example 9 is the assembly of example 8, wherein the instructions, when executed by the processor, cause the core module to further operate the display according to the second functionality UI mode by limiting output to the portion of the display not covered by the cover.

Example 10 is the assembly of example 8, wherein at least a portion of the cover that covers the portion of the display in the second position is translucent, and the instructions, when executed by the processor, cause the core module to further operate the display according to the second functionality UI mode by displaying at least one visual element on the covered portion of the display such that the at least one visual element is perceivable through the translucent portion of the cover.

Example 11 is the assembly of example 8, wherein the instructions, when executed by the processor, cause the core module to further operate the display according to the second functionality UI mode by activating touch input on the exposed portion of the display, and disabling touch input on the covered portion of the display.

Example 12 is the assembly of any of examples 1 to 11, wherein the assembly comprises a wearable device, wherein the housing is configured to be worn by a user, and wherein the core module further includes a barcode reader configured to optically capture at least one image of at least one printed identification data, an RFID radio configured to electrically capture identification data from at least one RFID tag, and an RFID antenna.

Example 13 is the assembly of any of examples 1 to 12, wherein the touch UI element comprises a capacitive touch sensor on a bezel surrounding at least a portion of the display.

Example 14 is the assembly of any of examples 1 to 13, wherein the cover, in the second position, couples with the housing to secure the core module within the housing.

Example 15 is the assembly of any of examples 1 to 14, wherein the cover selectively rotates between the first and second positions.

Example 16 is a method of operating a wearable device including a display, a UI element extending around at least a portion of an outer periphery of the display, and a cover selectively positionable in a first position to expose the UI element and the display, and in a second position that covers at least a portion of the UI element and at least a portion of the display, the method comprising: detecting a position of the cover; when the position of the cover is the first position, operating the display and the UI element according to a first functionality UI mode; and when the cover is positioned in the second position, operating the display and the UI element according to a second functionality UI mode.

Example 17 is the method of example 16, wherein detecting the position of the cover includes detecting the cover with at least one of a capacitive sensor, a proximity sensor or a Hall sensor.

Example 18 is the method of any of examples 16 to 17, wherein operating the display according to the first functionality UI mode includes configuring a highest supported resolution on the display, and activating touch input of the display.

Example 19 is the method of any of examples 16 to 18, wherein operating the display according to the second functionality UI mode includes configuring the display in a reduced power consumption mode and a reduced resolution on an exposed portion of the display, and disabling a covered portion of the display.

Example 20 is the method of any of examples 16 to 19, wherein the UI element comprises a capacitive touch sensor on a bezel surrounding at least a portion of the display.

From the foregoing, it will be appreciated that example improved devices having protective screens selectively positionable to switch devices between user interface modes and methods of operating the same have been disclosed. The improved devices and protective screens allow a user to both access a full functionality UI mode and keep their device protected from unintentional damage.

As used herein, each of the terms "tangible machine-readable medium," "non-transitory machine-readable medium," "machine-readable storage device," "tangible computer-readable medium," "non-transitory computer-readable medium" and "computer-readable storage device" is expressly defined as a storage medium (e.g., a platter of a hard disk drive, a digital versatile disc, a compact disc, flash memory, read-only memory, random-access memory, etc.) on which computer- or machine-readable instructions (e.g., program code in the form of, for example, software and/or firmware) are stored for any suitable duration of time (e.g., permanently, for an extended period of time (e.g., while a program associated with the computer- or machine-readable instructions is executing), and/or a short period of time (e.g., while the computer- or machine-readable instructions are cached and/or during a buffering process)). Further, as used herein, each of the terms "tangible machine-readable medium," "non-transitory machine-readable medium," "machine-readable storage device," "tangible computer-readable medium," "non-transitory computer-readable medium" and "computer-readable storage device" is expressly defined to exclude propagating signals. That is, as used in any claim of this patent, none of the terms "tangible machine-readable medium," "non-transitory machine-readable medium," "machine-readable storage device," "tangible computer-readable medium," "non-transitory computer-readable medium" and "computer-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, A, B or C refers to any combination or subset of A, B, C such as (1) A alone, (2) B alone, (3) C alone, (4) A with B, (5) A with C, (6) B with C, and (7) A with B and with C. As used herein, the phrase "at least one of A or B" is intended to refer to implementations including any of (1) at least one A, (2) at least one B, and (3) at least one A and at least one B. Similarly, the phrase "at least one of A and B" is intended to refer to implementations including any of (1) at least one A, (2) at least one B, and (3) at least one A and at least one B. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

As used herein, the expressions "in communication," "coupled" and "connected," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An assembly, comprising:
   a core module including
      a processor,
      a display,
      a touch user interface (UI) element extending around at least a portion of an outer periphery of the display, and
      a non-transitory computer-readable medium storing instructions;
   a housing configured to removably receive the core module; and
   a cover selectively positionable in a first position to expose the touch UI element and the display, and in a second position to cover a portion of the touch UI element and at least a portion of the display,
   wherein the instructions, when executed by the processor, cause the core module to:
      when the cover is positioned in the first position, operate the display and the touch UI element according to a first functionality UI mode, wherein the entire touch UI element is enabled in the first functionality UI mode and,
      when the cover is positioned in the second position, operate the display and the touch UI element according to a second functionality UI mode, wherein the covered portion of the touch UI element is disabled in the second functionality UI mode,
   wherein the touch UI element comprises a capacitive touch sensor on a bezel surrounding at least a portion of the display, and
the assembly further comprising a data capture device,
   wherein the data capture device is one of the set of:
      a barcode reader configured to optically capture at least one image of at least one printed identification data, and
      a radio frequency identification (RFID) radio coupled to an RFID antenna and configured to electrically capture identification data from at least one RFID tag.

2. The assembly of claim 1, wherein the first functionality UI mode is a full functionality UI mode, and the second functionality UI mode is a reduced functionality UI mode.

3. The assembly of claim 1, wherein the instructions, when executed by the processor, cause the core module to detect the position of the cover.

4. The assembly of claim 1, wherein the cover includes a conductive pad, and the instructions, when executed by the processor, cause the core module to detect the cover in the second position by sensing contact or near contact between the conductive pad and the touch UI element or the display.

5. The assembly of claim 1, wherein the core module includes a proximity sensor, and the instructions, when executed by the processor, cause the core module to detect the cover in the first position when the proximity sensor senses the cover in the first position.

6. The assembly of claim 1, wherein the cover includes a magnet, the core module includes a Hall sensor, and the instructions, when executed by the processor, cause the core module to detect the cover in the second position when the Hall sensor senses the magnet.

7. The assembly of claim 1, wherein the instructions, when executed by the processor, cause the core module to operate the display according to the first functionality UI mode by configuring a highest supported resolution on the display, and activating touch input.

8. The assembly of claim 1, wherein the instructions, when executed by the processor, cause the core module to operate the display according to the second functionality UI mode by configuring the display in a reduced power consumption mode and a reduced resolution on an exposed portion of the display.

9. The assembly of claim 8, wherein the instructions, when executed by the processor, cause the core module to further operate the display according to the second functionality UI mode by limiting output to the portion of the display not covered by the cover.

10. The assembly of claim 8, wherein at least a portion of the cover that covers the portion of the display in the second position is translucent, and the instructions, when executed by the processor, cause the core module to further operate the display according to the second functionality UI mode by displaying at least one visual element on the covered portion of the display such that the at least one visual element is perceivable through the translucent portion of the cover.

11. The assembly of claim 8, wherein the instructions, when executed by the processor, cause the core module to further operate the display according to the second functionality UI mode by activating touch input on the exposed portion of the display, and disabling touch input on the covered portion of the display.

12. The assembly of claim 1, wherein the cover, in the second position, couples with the housing to secure the core module within the housing.

13. The assembly of claim 1, wherein the cover selectively rotates between the first and second positions.

14. A method of operating a wearable device including a display, a touch user interface (UI) element extending around at least a portion of an outer periphery of the display, and a cover selectively positionable in a first position to expose the touch UI element and the display, and in a second position that covers a portion of the touch UI element and at least a portion of the display, the wearable device including a data capture device, wherein the data capture device is one of the set of: a barcode reader configured to optically capture at least one image of at least one printed identification data, and a radio frequency identification (RFID) radio coupled to an RFID antenna and configured to electrically capture identification data from at least one RFID tag, the method comprising:
  detecting a position of the cover;
  when the position of the cover is the first position, operating the display and the touch UI element according to a first functionality UI mode, wherein the entire touch UI element is enabled in the first functionality UI mode; and
  when the cover is positioned in the second position, operating the display and the touch UI element according to a second functionality UI mode, wherein the covered portion of the touch UI element is disabled in the second functionality UI mode,
  wherein the touch UI element comprises a capacitive touch sensor on a bezel surrounding at least a portion of the display.

15. The method of claim 14, wherein detecting the position of the cover includes detecting the cover with at least one of a capacitive sensor, a proximity sensor or a Hall sensor.

16. The method of claim 14, wherein operating the display according to the first functionality UI mode includes configuring a highest supported resolution on the display, and activating touch input of the display.

17. The method of claim 14, wherein operating the display according to the second functionality UI mode includes configuring the display in a reduced power consumption mode and a reduced resolution on an exposed portion of the display, and disabling a covered portion of the display.

* * * * *